United States Patent
Ohdate (10) Patent No.: US 8,482,648 B2
(45) Date of Patent: Jul. 9, 2013

(54) IMAGE PICKUP APPARATUS THAT FACILITATES CHECKING OF TILT THEREOF, METHOD OF CONTROLLING THE SAME, AND STORAGE MEDIUM

(75) Inventor: Takayoshi Ohdate, Oita (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 13/071,052

(22) Filed: Mar. 24, 2011

(65) Prior Publication Data
US 2011/0242394 A1    Oct. 6, 2011

(30) Foreign Application Priority Data
Mar. 30, 2010   (JP) .................................. 2010-078015

(51) Int. Cl.
*H04N 5/222* (2006.01)
(52) U.S. Cl.
USPC .................................................... 348/333.02
(58) Field of Classification Search
USPC .................. 348/333.02, 345, 333.03, 333.01
See application file for complete search history.

(56) References Cited

U.S. PATENT DOCUMENTS

| | | | |
|---|---|---|---|
| 7,956,902 B2* | 6/2011 | Matsubara | 348/222.1 |
| 2005/0117024 A1* | 6/2005 | Lee | 348/208.15 |
| 2005/0276596 A1* | 12/2005 | Chan et al. | 396/296 |
| 2008/0204566 A1* | 8/2008 | Yamazaki et al. | 348/208.99 |
| 2009/0021599 A1* | 1/2009 | Matsubara | 348/222.1 |
| 2009/0059029 A1* | 3/2009 | Hoshii | 348/222.1 |
| 2009/0096910 A1* | 4/2009 | Yasuda et al. | 348/333.01 |
| 2012/0069234 A1* | 3/2012 | Yasuda et al. | 348/333.06 |

FOREIGN PATENT DOCUMENTS

| | | |
|---|---|---|
| CN | 101258741 A | 9/2008 |
| JP | 64-40824 | 2/1989 |
| JP | 2002-271654 | 9/2002 |

OTHER PUBLICATIONS

The above reference was cited in a Jan. 11, 2013 Chinese Office Action, which is enclosed with an English Translation, that issued in Chinese Patent Application No. 201110080560.9.

* cited by examiner

*Primary Examiner* — Aung S Moe
*Assistant Examiner* — Amy Hsu
(74) *Attorney, Agent, or Firm* — Cowan, Liebowitz & Latman, P.C.

(57) ABSTRACT

An image pickup apparatus that facilitates checking of the tilt thereof by changing a display position of a horizontal guide. A digital camera (image pickup apparatus) includes a tilt sensor for detecting a tilt of the camera. A system controller determines the display position of the horizontal guide based on the tilt of the camera detected by the tilt sensor such that it is displayed in an upper portion of the screen when an angle formed between the optical axis of the camera and a gravity direction is smaller than when the angle is equal to a predetermined angle. The system controller causes the horizontal guide to be displayed on the screen at the determined position, together with an image picked up by an image pickup device.

7 Claims, 7 Drawing Sheets

IMAGE PICKUP APPARATUS THAT FACILITATES CHECKING OF TILT THEREOF, METHOD OF CONTROLLING THE SAME, AND STORAGE MEDIUM

BACKGROUND OF THE INVENTION

1. Field of the Invention

The present invention relates to an image pickup apparatus configured to display a guide for maintaining a horizontal position thereof during shooting, a method of controlling the image pickup apparatus, and a storage medium.

2. Description of the Related Art

For digital cameras and the like, there has been proposed a technique that causes the user to be aware of and maintain the horizontal position of a camera during shooting in order to make photographed images more viewable.

Conventionally, there has been proposed a digital camera that detects a tilt angle of the camera by an attitude detection unit and displays a display pattern indicative of the detected tilt angle on a screen to make the photographer be aware that the camera is tilted, so as to help the user pay attention to the horizontal position of the camera (see e.g. Japanese Patent Laid-Open Publication No. S64-40824).

Further, conventionally, there has been proposed a digital camera that shows the tilt of the camera by displaying both of a horizontal reference line and a line indicative of the tilt of the camera in respective different colors, and displays the lines as one line when the camera is in a horizontal position (see e.g. Japanese Patent Laid-Open Publication No. 2002-271654).

The above-described guides displayed for making the photographer be aware that the camera is tilted have been conventionally presented in a predetermined position, such as a central portion of the screen, regardless of the tilt (elevation angle) of the camera in a front-rear direction along the optical axis.

However, for example, when the camera is pointed upward (elevation angle>0°), the horizon contained in an object image is displayed at a lower portion of the screen, and at the same time a horizontal guide is displayed at a central portion of the screen. Therefore, in such a camera, the horizontal line and the horizontal guide are displayed at respective locations remote from each other, which makes it difficult to check the tilt of the camera.

SUMMARY OF THE INVENTION

The present invention facilitates checking of the tilt of an image pickup apparatus by detecting a tilt of the optical axis of the image pickup apparatus with respect to the gravity direction to thereby cause a horizontal guide to be displayed closer to a horizon contained in an object image picked up by the image pick up apparatus.

In a first aspect of the present invention, there is provided an image pickup apparatus comprising an image pickup unit that includes an image pickup device configured to perform photoelectric conversion on an object image, and is configured to generate an image signal based on a signal output from the image pickup device, a tilt detection unit configured to detect a tilt of the image pickup apparatus, a display section configured to display an image, an image display control unit configured to control the display section to display the image based on the image signal output from the image pickup unit, a position determination unit configured to determine a display position of a horizontal guide on the display section, based on the tilt of the image pickup apparatus detected by the tilt detection unit, such that the horizontal guide is displayed in an upper portion of the display section when an angle formed between an optical axis of the image pickup apparatus and a gravity direction is smaller than when the angle formed between the optical axis and the gravity direction is equal to a predetermined angle, and a control unit configured to cause the horizontal guide to be displayed at the display position determined by the position determination unit, together with the image based on the image signal, on the display section.

In a second aspect of the present invention, there is provided a method of controlling an image pickup apparatus including an image pickup device that performs photoelectric conversion on an object image, and a display unit that displays an image, comprising generating an image signal based on a signal output from the image pickup device, detecting a tilt of the image pickup apparatus, controlling the display section to display an image based on the generated image signal, determining a display position of a horizontal guide on the display section, based on the detected tilt of the image pickup apparatus, such that the horizontal guide is displayed in an upper portion of the display section when an angle formed between an optical axis of the image pickup apparatus and a gravity direction is smaller than when the angle formed between the optical axis and the gravity direction is equal to a predetermined angle, and causing the horizontal guide to be displayed at the determined display position, together with the image based on the image signal, on the display section.

In a third aspect of the present invention, there is provided a non-transitory computer-readable storage medium storing a computer-executable program for causing a computer to execute a method of controlling an image pickup apparatus including an image pickup device that performs photoelectric conversion on an object image, and a display unit that displays an image, wherein the method comprises generating an image signal based on a signal output from the image pickup device, detecting a tilt of the image pickup apparatus, controlling the display section to display an image based on the generated image signal, determining a display position of a horizontal guide on the display section, based on the detected tilt of the image pickup apparatus, such that the horizontal guide is displayed in an upper portion of the display section when an angle formed between an optical axis of the image pickup apparatus and a gravity direction is smaller than when the angle formed between the optical axis and the gravity direction is equal to a predetermined angle, and causing the horizontal guide to be displayed at the determined display position, together with the image based on the image signal, on the display section.

The present invention provides advantageous effects that the image pickup apparatus enables a user to check the tilt of the camera more easily by changing the display position of the horizontal guide based on the detected tilt of the direction perpendicular to the optical axis of the image pickup apparatus with respect to the gravity direction.

Further features of the present invention will become apparent from the following description of exemplary embodiments with reference to the attached drawings.

DETAILED DESCRIPTION OF THE EMBODIMENTS

The present invention will now be described in detail below with reference to the accompanying drawings showing embodiments thereof.

Figure 1:
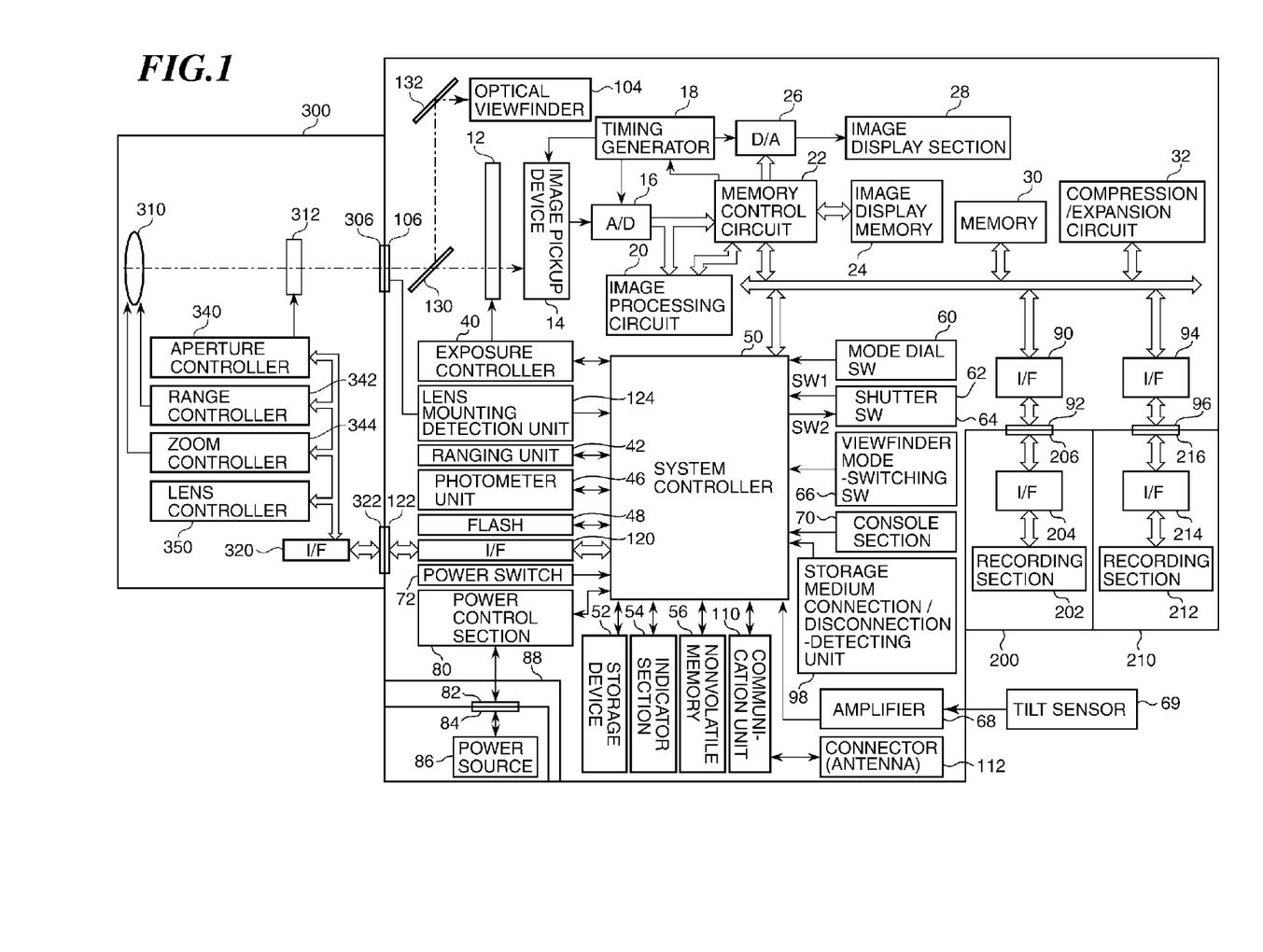
FIG. 1 is a block diagram of a digital camera as an image pickup apparatus according to a first embodiment of the present invention.

FIG. 1 is a block diagram of a digital camera as an image pickup apparatus according to a first embodiment of the invention. Reference numeral 100 denotes a digital camera. Further, in FIG. 1, reference numeral 14 denotes an image pickup device that converts an optical image to an electric signal (performs photoelectrical conversion of an object image), and reference numeral 12 denotes a shutter for controlling the amount of exposure to the image pickup device 14.

In the digital camera 100, a beam of light incident on a photographic lens 310 is guided via a diaphragm 312, lens mounts 306 and 106, a mirror 130, and the shutter 12, to form an image on the image pickup device 14 as an optical image, by the so-called single-lens reflex method.

In FIG. 1, reference numeral 16 denotes an A/D converter that converts an output signal, which is analog, from the image pickup device 14 to a digital signal which is an image signal. In FIG. 1, reference numeral 18 denotes a timing generator that supplies a clock signal and a control signal to the image pickup device 14, the A/D converter 16, and a D/A converter 26, and is controlled by a memory control circuit 22 and a system controller 50. In short, the digital camera 100 generates the image signal based on the output signal from the image pickup device 14.

The system controller 50 controls the overall operation of the digital camera 100, and functions as an image display control unit and a control unit. Reference numeral 52 denotes a storage device that stores constants and variables, programs, and so forth, for the operation of the system controller 50. The system controller 50 executes various kinds of processes shown in flowcharts, described hereinafter, by loading the programs stored in the storage device 52 into a memory 30 and executing the same.

In FIG. 1, reference numeral 20 denotes an image processing circuit that performs predetermined pixel interpolation processing and predetermined color conversion processing on data (digital signal) from the A/D converter 16 or data from the memory control circuit 22. The image processing circuit 20 performs predetermined calculation processing, using picked-up image data, as required. Then, based upon the results of the calculation processing, the system controller 50 controls an exposure controller 40, an aperture controller 340, and a range controller 342 to perform AF (auto focus) processing, AE (auto exposure) processing, and EF (electronic flash pre-emission) processing, by the so-called TTL (through the lens) method.

Further, the image processing circuit 20 performs predetermined calculation processing using the picked-up image data, and also performs AWB (auto white balance) processing by the TTL method based on the results of the calculation processing.

It should be noted that the digital camera 100 of the present embodiment is configured to have a ranging unit 42 and a photometer unit 46, as dedicated components. Therefore, the digital camera 100 performs AF (auto focus) processing, AE (auto exposure) processing and EF (electronic flash pre-emission) processing, using the ranging unit 42 and the photometer unit 46. It should be noted that the digital camera 100 may be configured not to perform AF (auto focus) processing, AE (auto exposure) processing, and EF (electronic flash pre-emission) processing, using the ranging unit 42 and the photometer unit 46.

Further, the digital camera 100 may be configured to perform AF (auto focus) processing, AE (auto exposure) processing and EF (electronic flash pre-emission) processing, using the image processing circuit 20.

In FIG. 1, the memory control circuit 22 controls the A/D converter 16, the timing generator 18, the image processing circuit 20, an image display memory 24, the D/A converter 26, the memory 30, and a compression/expansion circuit 32

The data from the A/D converter 16 is written into the image display memory 24 or the memory 30, either via the image processing circuit 20 and the memory control circuit 22 or via the memory control circuit 22 alone.

Reference numeral 28 denotes an image display section comprising a TFT liquid crystal display (LCD). Display image data written in the image display memory 24 is displayed via the D/A converter 26 on the image display section 28. The image display section 28 is arranged on a rear side of the digital camera 100 opposite from a side of the same where an object image enters the photographic lens 310.

When the digital camera 100 is configured such that image data picked up by the image pickup device 14 is sequentially displayed on the image display section 28, it is possible to implement an electronic viewfinder by the image display section 28.

Further, the display operation of the image display section 28 can be turned on or off as desired by an instruction from the system controller 50. If the display operation of the display section 28 is turned off, the power consumption of the digital camera 100 can be largely reduced.

The memory 30 provided in the digital camera 100 is used for storing picked-up still images and moving images, and has a sufficiently large storage capacity for storing a predetermined number of still images and a predetermined recording time period of moving image data. This enables high-speed writing of a large amount of image data into the memory 30 even in continuous shooting in which a plurality of still images are consecutively photographed or in panorama shooting. Further, the memory 30 can also be used as a work area for the system controller 50.

The compression/expansion circuit 32 provided in the digital camera 100 compresses or expands image data by adaptive discrete cosine transformation (ADCT) or the like. The compression/expansion section 32 reads image data stored in the memory 30 and performs compression or expansion processing on the read image data, and writes the processed data into the memory 30.

The above-mentioned exposure controller 40 controls the shutter 12 based on photometry information from the photometer unit 46 in cooperation with the aperture controller 340 which controls the diaphragm 312.

The above-mentioned ranging unit 42 is used for performing the AF (auto focus) processing. In the digital camera 100, a beam of light incident on the photographic lens 310 is caused to enter the ranging unit 42 by the single-lens reflex method via the diaphragm 312, the lens mounts 306 and 106, the mirror 130, and a ranging sub mirror, not shown, whereby the digital camera 100 measures an in-focus state of an image formed as an optical image.

The above-mentioned photometer unit 46 is used for performing the AE (auto exposure) processing. The beam of light incident on the photographic lens 310 is caused to enter the photometer unit 46 by the single-lens reflex method via the diaphragm 312, the lens mounts 306 and 106, the mirror 310, a mirror 132, and a photometric lens, not shown, whereby an exposure state of the image formed as the optical image is measured.

Further, the photometer unit 46 is also equipped with an EF (electronic flash pre-emission) processing function realized by cooperation with a flash 48.

The flash 48 also has an AF auxiliary light emission function and an electronic flash pre-emission function.

In the digital camera 100, the image processing circuit 20 performs calculation on the image data picked up by the image pickup device 14. The system controller 50 can perform the exposure control and AF control by a video TTL method in which the exposure controller 40, the aperture controller 340, and the range controller 342 are controlled based on results of the calculation.

The system controller 50 may be also configured to perform the AF control using both of results of measurement by the ranging unit 42 and results of calculation performed by the image processing circuit 20 on image data picked up by the image pickup device 14.

Further, the system controller 50 may be configured to perform the exposure control using both of results of measurement by the photometer unit 46 and results of calculation performed by the image processing circuit 20 on image data picked up by the image pickup device 14.

The digital camera 100 includes an indicator section 54 including a liquid crystal display device, a speaker, etc., for indicating the operating state of the digital camera 100 and messages, using characters, images, voices, and so forth, in accordance with execution of programs by the system controller 50.

The components of the indicator section 54 are disposed at a single or a plurality of locations close to a console section 70 of the digital camera 100, where the components are easily viewable. The indicator section 54 is implemented e.g. by a combination of an LCD, LEDs, sounding elements, etc. Further, some of functions of the indicator section 54 are realized within an optical viewfinder 104.

Examples of contents to be displayed on the LCD or the like of the indicator section 54 include a single shot/continuous shot display, a self-timer display, a compression ratio display, a recording pixel number display, a recorded shot number display, a remaining shot number display, and a shutter speed display. The contents to be displayed on the LCD or the like of the indicator section 54 further include an aperture value display, an exposure correction display, a flash display, a red-eye reduction display, a macro shooting display, a beep setting display, a clock battery remaining power display, a remaining battery power display, an error display, and an information display by a plurality of digits. In addition to these contents, the contents to be displayed on the LCD or the like of the indicator section 54 include an attached/detached state display for storage mediums 200 and 210, and an attached/detached state display for a lens unit 300, a communication interface operation display, a date and time display, and a display indicating a state of connection to an external computer.

Furthermore, out of the contents to be displayed by the indicator section 54, the contents to be displayed in the optical viewfinder 104 include a focusing display, a shooting-ready display, a camera shake warning display, a flash charging display, a flash charging completion display, a shutter speed display, an aperture value display, an exposure correction display, and a display indicating a write operation to a storage medium.

Furthermore, out of the contents to be displayed by the indicator section 54, the contents to be displayed on the LEDs include a focusing display, a shooting-ready display, a camera shake warning display, a flash charging display, a flash charging completion display, a display indicating a write operation to a storage medium, a macro shooting setting notification display, and a secondary battery charged state display.

Furthermore, out of the contents to be displayed by the indicator section 54, the contents to be displayed on the lamp or the like include a self-timer notification lamp. The self-timer notification lamp may be commonly used as the AF auxiliary light.

In the block diagram of the digital camera shown in FIG. 1, reference numeral 56 denotes a nonvolatile memory that stores data in an electrically erasable and recordable manner, and is implemented e.g. by an EEPROM.

In FIG. 1, reference numeral 69 denotes a tilt sensor for detecting a tilt of the digital camera, and reference numeral 68 denotes an amplifier that amplifies output from the tilt sensor 69. In the digital camera of the present embodiment, as the tilt sensor 69, there is employed a triaxial acceleration sensor that is capable of sensing respective degrees of acceleration with respect to the triaxial directions of vertical, horizontal, and front-rear directions.

Further, in FIG. 1, reference numerals 60, 62, 64, 66, 70, 72, and so forth denote components of an operation unit, not specifically collectively denoted by a reference numeral, which is used for inputting various instructions for the operations of the system controller 50. The operation unit comprises dials, switches, a touch panel, a pointing element by line-of-sight detection, a voice recognition device, etc.

Next, a description will be given of the above-mentioned operation unit.

A mode dial switch, denoted by 60, of the operation unit is configured to be capable of selectively switching between functional shooting modes for setting. The functional shooting modes include e.g. an automatic shooting mode, a program shooting mode, a shutter speed priority shooting mode, an aperture priority shooting mode, a manual shooting mode, a focal depth priority (depth) shooting mode, and a portrait shooting mode. The functional shooting modes further include a scenery shooting mode, a close-up shooting mode, a sport shooting mode, a night view shooting mode, a panorama shooting mode, and so forth.

A shutter switch (SW1), denoted by 62, of the operation unit is configured to be turned on by a user's operation of half pressing a shutter button, not shown. The shutter switch (SW1) 62 instructs the system controller 50 to start operations of the AF (auto focus) processing, the AE (auto exposure) processing, the AWB (auto white balance) processing, the EF (electronic flash pre-emission) processing, and so forth.

A shutter switch (SW2), denoted by 64, of the operation unit is configured to be turned on when a user's operation of pressing the shutter button, not shown, is completed.

The shutter switch (SW2) 64 instructs the system controller 50 to start operations of a sequence of photographing processes. The sequence of photographing processes include an exposure process for writing a signal read from the image pickup device 14 into the memory 30 via the A/D converter 16 and the memory control circuit 22 as image data, and a development process using calculation by the image processing circuit 20 and the memory control circuit 22. Following these processes, the sequence of photographing processes include a recording process for reading the image data from the memory 30, compressing the read image data by the compression/expansion circuit 32, and writing the compressed image data into the storage medium 200 or 210.

A viewfinder mode-switching switch, denoted by 66, of the operation unit is configured to enable a user to selectively set either an optical viewfinder (normal shooting mode) or an electronic viewfinder (EVF) by an operation thereof. In the normal shooting mode, it is possible to view an object image via the optical viewfinder 104. In the EVF mode, it is possible to view an object image via the image display section 28.

In the block diagram of the digital camera shown in FIG. 1, reference numeral 130 denotes the mirror. The mirror 130 and the ranging sub mirror, not shown, are configured to be capable of selectively shifting the optical path state between the two states of a first optical path state (first state) and a second optical path state (second state).

In the first optical path state (first state), the mirror 130 and the ranging sub mirror guide light to the optical viewfinder 104 and the ranging unit 42, as described hereinafter. In the second optical path state (second state), the mirror 130 and the ranging sub mirror causes light from the photographic lens 310 to be directly received by the image pickup device 14.

In the first optical path state, it is possible to view an object image via the optical viewfinder 104, and perform focus detection by the ranging unit 42.

In the second optical path state, the mirror 130 and the ranging sub mirror are retreated from the photographic optical path, so that the light from the photographic lens 310 can directly reach the image pickup device 14. Thus, in the second optical path state, it is possible to display an object image on the image display section 28 based on the output from the image pickup device 14, or perform photographing.

It should be noted that although in the present embodiment, the description has been given of the two optical path states, light may be simultaneously guided to the image pickup device 14 and the ranging unit 42 using a half mirror or by any other suitable method. Such a configuration enables execution of focus detection while displaying the object image on the image display section 28.

The console section, denoted by 70, of the operation unit comprises various buttons and the touch panel, none of which are particularly denoted. The console section 70 includes a menu button, a set button, a macro button, a multi-screen reproduction page break button, a flash setting button, a single shooting/continuous shooting/self-timer shooting-switching button, and a menu shift+(plus) button. The console section 70 further includes a menu shift−(minus) button, a playback image shift+(plus) button, a playback image shift−(minus) button, a shooting image quality selection button, an exposure correction button, and a date/time setting button. The console section 70 includes a selection/switching button for switching between various functions for selection and setting before performing shooting or playback in the panorama mode or the like. The console section 70 includes a determination/execution button for setting determination and execution of the various functions when executing shooting and playback in the panorama mode or like other operations, and an image display on/off switch for setting on/off of the image display section 28. The console section 70 includes a quick review on/off switch for setting a quick review function which automatically reproduces picked-up image data immediately after photographing. The console section 70 includes a compression mode switch for selecting a compression ratio of JPEG compression or selecting a CCDRAW mode in which a signal from the image pickup device is directly digitized and recorded in a recording medium. The console section 70 includes a playback switch that can set various function modes, such as a playback mode, a multi-screen playback/erase mode, and a PC connection mode, and an AF mode-setting switch.

The AF mode-setting switch can set a one-shot AF mode in which the auto focus operation is started upon depression of the shutter switch (SW1) 62, and once a focused state is reached, the focused state is held thereafter. Further, the AF mode-setting switch can also set a servo AF mode in which the auto focus operation is continued during depressing of the shutter switch (SW1) 62.

As for each plus button and minus button of the operation unit, they may be replaced by a rotating dial switch, whereby selection of various functions associated therewith and setting of values thereby can be facilitated.

A power switch, denoted by 72, of the operation unit has a function of switching between power-on and power-off modes of the digital camera 100. In addition, the power switch 72 has a function of switching the power-on and power-off of each of various accessory units connected to the digital camera 100, such as the lens unit 300, an external strobe, and the storage mediums 200 and 210.

A power control section 80 comprise a battery detection circuit, a DC-DC converter, and a switch circuit for switching blocks to be energized, none of which are shown. The power control section 80 detects whether a battery is mounted or removed, a battery type, and remaining battery power, and controls the DC-DC converter based on the results of detection and instructions from the system controller 50 to supply necessary voltage for a required time period to the sections including the storage mediums.

A power unit 88 comprises a connector 82, a connector 84, a power source 86 which may be implemented by a primary battery, such as an alkaline battery and a lithium battery, or a secondary battery, such as an NiCd batter, an NiMH battery, and an Li battery, or/and an AC adapter, not shown.

In the block diagram of the digital camera shown in FIG. 1, reference numerals 90 and 94 denote interfaces which provide interface with storage mediums 200 and 210, such as a memory card and a hard disk. Further, in FIG. 1, reference numerals 92 and 96 denote connectors for connection with the storage mediums 200 and 210, such as the memory card and the hard disk. Further, in FIG. 1, reference numeral 98 denotes a storage medium connection/disconnection-detecting unit for detecting whether or not the storage medium 200 is connected to the connector 92, or whether or not the storage medium 210 is connected to the connector 96.

It should be noted that the above-described digital camera shown in FIG. 1 has two types of interfaces and connectors for connection of storage mediums. However, the present invention is not limited to this, but a single or a plurality of interfaces and connectors for connection of storage mediums may be provided. Further, a combination formed by interfaces and connectors which are different in standards may be provided.

Further, each interface and each connector can be implemented by any of those in conformity with the standards, such as a PCMCIA card and a CF (Compact Flash (registered trademark)) card.

This enables connection with various communication cards, such as a LAN card, a modem card, a USB card, an IEEE1394 card, a P1284 card, a SCSI card, and a communication card for a PHS or the like. Therefore, the digital camera shown in FIG. 1 is capable of transferring image data and management information attached to the image data to and from peripheral equipments, such as other computers and a printer.

The digital camera 100 shown in FIG. 1 includes the optical viewfinder 104 as mentioned above. In this digital camera, a beam of light incident on the photographic lens 310 is guided by the single-lens reflex method via the diaphragm 312, the lens mounts 306 and 106, and the mirrors 130 and 132 to thereby form an image as an optical image for display. This makes it possible to perform photographing using the optical viewfinder 104 alone, without using an electronic viewfinder function of the image display section 28.

Further, some of functions of the indicator section 54, e.g. the focusing display, the camera shake warning display, the flash charging display, the shutter speed display, the aperture value display, and the exposure correction display are configured to be realized within the optical viewfinder 104, as mentioned hereinabove.

In the block diagram of the digital camera shown in FIG. 1, reference numeral 110 denotes a communication unit, which has various communication functions based on RS232C, USB, IEEE1394, P1284, SCSI, a modem, a LAN, and wireless communication.

In FIG. 1, reference numeral 112 denotes a connector for connecting the digital camera 100 with other devices or an antenna for wireless communication.

In FIG. 1, reference numeral 120 denotes an interface provided in the lens mount 106, for connecting the digital camera 100 with the lens unit 300.

In FIG. 1, reference numeral 122 denotes a connector for electrically connecting the digital camera 100 with lens unit 300.

In FIG. 1, reference numeral 124 denotes a lens mounting detection unit for detecting whether or not the lens unit 300 is mounted to the lens mount 106 and the connector 122. The connector 122 exchanges a control signal, a state signal, a data signal and so forth between the digital camera 100 and the lens unit 300, and also has a function of supplying electric currents of various voltages. Further, the connector 122 may be configured to perform not only electric communication but also optical communication and voice communication or the like.

In FIG. 1, as already mentioned hereinabove, reference numerals 130 and 132 respectively denote the mirrors for guiding a beam of light incident on the photographic lens 310 to the optical viewfinder 104 by the single-lens reflex method. It should be noted that the mirror 132 may be configured as a quick return mirror or a half mirror.

In FIG. 1, reference numeral 200 denotes the storage medium, such as the memory card or the hard disk. The storage medium 200 includes a recording section 202 implemented by a semi-conductor memory, a magnetic disk or the like, an interface 204 with the digital camera 100, and a connector 206 for connection with the digital camera 100.

In FIG. 1, reference numeral 210 denotes the other storage medium, such as the memory card or the hard disk. The storage medium 210 includes a recording section 212 implemented by a semi-conductor memory, a magnetic disk or the like, an interface 214 with the digital camera 100, and a connector 216 for connection with the digital camera 100.

In FIG. 1, reference numeral 300 denotes the lens unit of an interchangeable lens type, and reference numeral 306 denotes the lens mount for mechanically connecting the lens unit 300 with the digital camera 100. The lens mount 306 is equipped with various functions for electrically connecting the lens unit 300 with the digital camera 100.

In FIG. 1, reference numeral 310 denotes the photographic lens and reference numeral 312 denotes the diaphragm, as mentioned hereinabove.

In FIG. 1, reference numeral 320 denotes an interface provided within the lens mount 306, for connecting the lens unit 300 with the digital camera 100, and reference numeral 322 denotes a connector for electrically connecting the lens unit 300 with the digital camera 100.

The connector 322 exchanges the control signal, the state signal, the data signal and so forth between the digital camera 100 and the lens unit 300, and also has a function of receiving or supplying electric currents of various voltages. Further, the connector 322 may be configured to perform not only electric communication but also optical communication and voice communication or the like.

In FIG. 1, reference numeral 340 denotes the aperture controller for controlling the diaphragm 312 based on photometry information from the photometer unit 46 in cooperation with the exposure controller 40 which controls the shutter 12.

In FIG. 1, reference numeral 342 denotes the range controller that controls focusing of the photographic lens 310, and reference numeral 344 denotes a zoom controller that controls zooming of the photographic lens 310.

In FIG. 1, reference numeral 350 denotes a lens controller, which controls the overall operation of the lens unit 300. The lens controller 350 also has a function of a nonvolatile memory that stores identification information, management information, function information, current and past settings, and so forth. The identification information includes numbers uniquely assigned to the memory for storing constants, variables, programs, etc. for operation, and the lens unit 300, respectively. Further, the function information includes a maximum aperture value, a minimum aperture value, and a focal length.

Next, a description will be given of the tilt sensor 69 (triaxial acceleration sensor) mounted on the digital camera as the image pickup apparatus according to the present embodiment, with reference to FIG. 2.

Figure 2:
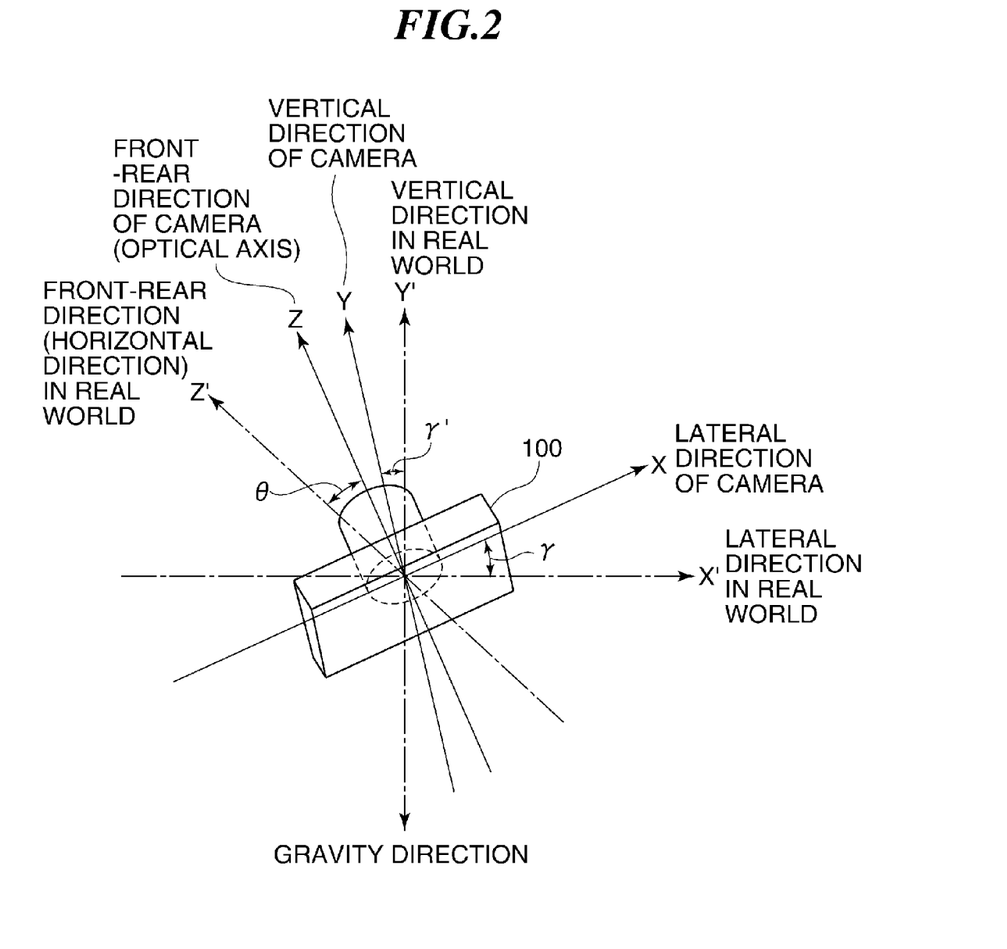
FIG. 2 is a view useful for explaining angles which can be detected by a tilt sensor (triaxial acceleration sensor) used in the digital camera.

In FIG. 2, the tilt sensor 69 incorporated in the digital camera 100 is capable of sensing respective degrees of acceleration with respect to the triaxial directions of X-axis, Y-axis, and Z-axis directions.

The X axis is an axis in a lateral direction of the digital camera 100 as viewed in FIG. 2. The digital camera 100 senses acceleration in the X-axis direction whereby the digital camera 100 is capable of detecting an angle γ formed between an X' axis which is an axis along a lateral direction in the real world (i.e. the lateral direction of the digital camera in its normal position) and the X axis.

On the other hand, the Y axis is an axis in a vertical direction of the digital camera 100 as viewed in FIG. 2. The digital camera 100 senses acceleration in the Y-axis direction, whereby the digital camera 100 is capable of detecting an angle γ' formed between a Y' axis which is an axis along a vertical direction in the real-world (gravity direction) and the Y axis. It should be noted that in FIG. 2, the orientation of the vertical direction in the real world along the Y' axis is 180 degrees opposite to the orientation of the gravity direction, and the gravity direction is assumed to be downward in the embodiments and appended claims.

These X axis and Y axis are both perpendicular to the optical axis of the digital camera 100. Therefore, if one of the angles γ and γ' can be detected, it is possible to calculate a tilt angle of the digital camera 100, which is necessary to display the horizontal guide.

The remaining Z axis is an axis corresponding to the front-rear direction of the digital camera 100, in other words to the optical axis. The digital camera 100 senses acceleration in the Z-axis direction, whereby the digital camera 100 is capable of detecting an angle θ (so-called an elevation or depression angle) formed between the Z axis and a Z' axis which is an axis along the front-rear direction (horizontal direction) in the real world. Based on the angle θ, the digital camera 100 can determine whether the optical axis points upward or downward, i.e. in which direction the digital camera 100 is set, an upward direction or a downward direction.

It should be noted that the front-rear direction (horizontal direction) in the real-world is a direction perpendicular to the above-defined gravity direction. Therefore, the angle θ may be determined by detecting an angle formed between the Z axis and the gravity direction and then subtracting 90° from the detected angle. It is assumed here that the angle θ assumes a larger value as the angular difference between the front-rear direction (Z axis, i.e. optical axis) of the digital camera 100 and the gravity direction is larger. More specifically, the tilt angle (θ) of the digital camera 100 in the front-rear direction is such that the tilt angle of the axis in the front-rear direction (horizontal direction) in the real world (Z' axis) is 0 degrees, and elevation and depression angles of the front-rear direction (optical axis) of the digital camera 100 with respect to the Z' axis are represented by values having respective plus and minus signs such that as each of the elevation and depression angles increases, the absolute value of the tilt angle corresponding thereto becomes larger.

By using the triaxial acceleration sensor, the digital camera 100 can detect a tilt thereof as viewed in FIG. 2 by respective angles of γ in the lateral direction, γ' in the vertical direction, and θ in the front-rear direction.

Next, a description will be given of the relationship between the tilt of the digital camera in the lateral direction (X axis) and an output from the tilt sensor 69 with respect to the X-axis direction, with reference to FIGS. 3A to 3D.

Figure 3A:
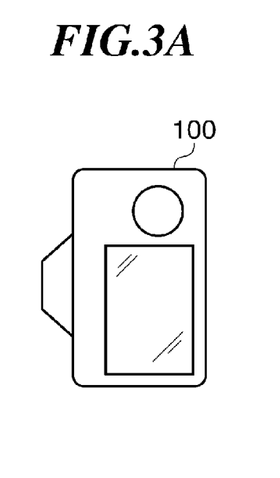
FIGS. 3A, 3B, 3C, and 3D are views useful in explaining the relationship between a tilt of the digital camera in a lateral direction and an output from the tilt sensor.
Figure 3B:
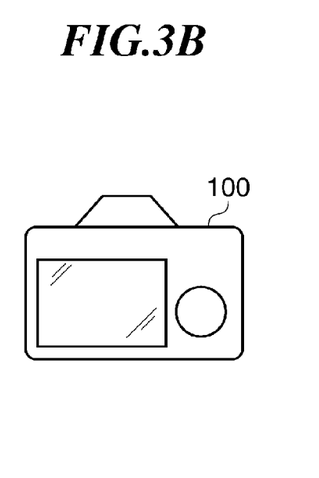
Figure 3C:
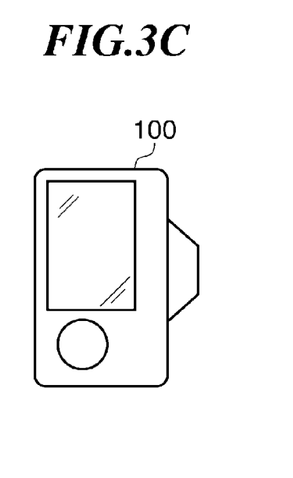

FIGS. 3A, 3B, and 3C each show a rear side of the digital camera 100. FIG. 3B illustrates a state of the digital camera 100 during normal shooting (in normal position). FIG. 3A illustrates a state of the digital camera 100 tilted leftward through 90 degrees, and FIG. 3C illustrates a state of the digital camera 100 tilted rightward through 90 degrees.

Figure 3D:
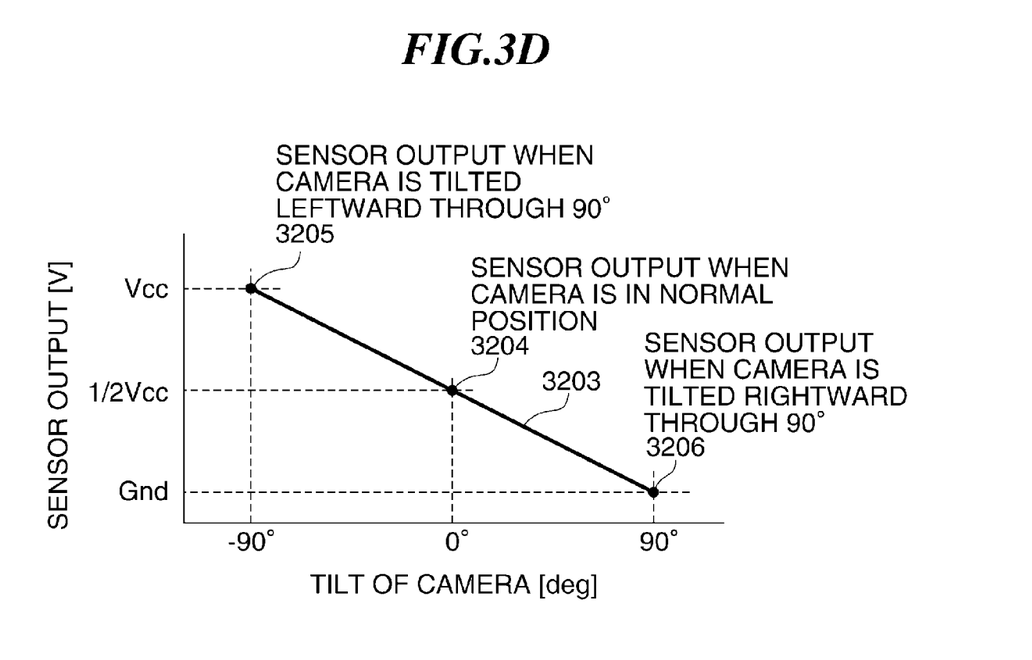

FIG. 3D illustrates output characteristics of the tilt sensor 69 with respect to the X-axis direction in the respective states shown in FIGS. 3A, 3B, and 3C. In FIG. 3D, the vertical axis represents an output from the tilt sensor 69 with respect to the X-axis direction, the horizontal axis represents a tilt of the digital camera 100 in the lateral direction, and a straight line 3203 represents an amount of change in the output from the tilt sensor 69 with respect to the X-axis direction, occurring according to the tilt of the digital camera in the lateral direction. In the output characteristics shown in FIG. 3D, the output from the tilt sensor 69 with respect to the X-axis direction is configured to take values within an output range illustrated therein by properly configuring the gain setting of the amplifier 68 that amplifies the output from the tilt sensor 69 with respect to the X-axis direction.

In FIG. 3D, a point 3204 indicates an output from the tilt sensor 69 with respect to the X-axis direction when the digital camera 100 is in the normal position, which is equal to ½ of a power supply voltage Vcc.

On the other hand, when the digital camera 100 is tilted leftward through 90 degrees as shown in FIG. 3A, the output from the tilt sensor 69 with respect to the X-axis direction is equal to the power supply voltage Vcc as indicated by a point 3205.

Inversely, when the digital camera 100 is tilted rightward through 90 degrees as shown in FIG. 3C, the output from the tilt sensor 69 with respect to the X-axis direction is equal to a ground (GND) level as indicated by a point 3206.

The slope between the points 3204 and 3205, or between the points 3204 and 3206 indicates characteristics that the output from the tilt sensor 69 with respect to the X-axis direction linearly changes with respect to the tilt of the camera in the lateral direction. Therefore, in this digital camera 100, by acquiring the output from the tilt sensor 69 with respect to the X-axis direction, it is possible to calculate the current angle of tilt of the digital camera 100 in the lateral direction, which makes it possible to display the horizontal guide.

Assuming that the tilt sensor 69 is mounted in an opposite direction, when the digital camera 100 is tilted in the lateral direction, the sensor output voltage changes inversely to the FIG. 3D illustration.

Next, a description will be given of a relationship between a tilt of the digital camera in the front-rear direction along the optical axis (Z axis) and an output from the tilt sensor 69 with respect to the Z-axis direction, with reference to FIGS. 4A to 4D.

Figure 4A:
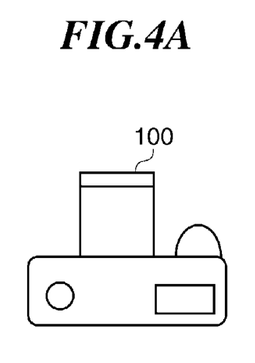
FIGS. 4A, 4B, 4C, and 4D are views useful in explaining the relationship between a tilt of the digital camera in a vertical direction and an output from the tilt sensor.
Figure 4B:
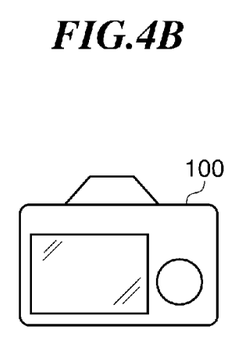

FIG. 4B illustrates a state of the digital camera 100 during normal shooting (in normal position), i.e. a state in which the elevation angle (angle formed between the optical axis and a horizontal surface) is equal to 0 degrees. FIG. 4A illustrates a state of the digital camera 100 tilted upward through 90 degrees (the elevation angle is equal to 90 degrees), and FIG. 4C illustrates a state of the digital camera 100 tilted downward through 90 degrees (the depression angle is equal to 90 degrees).

Figure 4C:
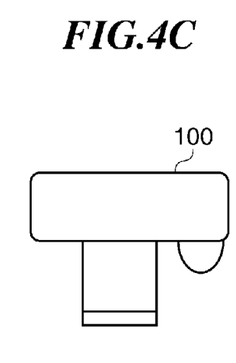
Figure 4D:
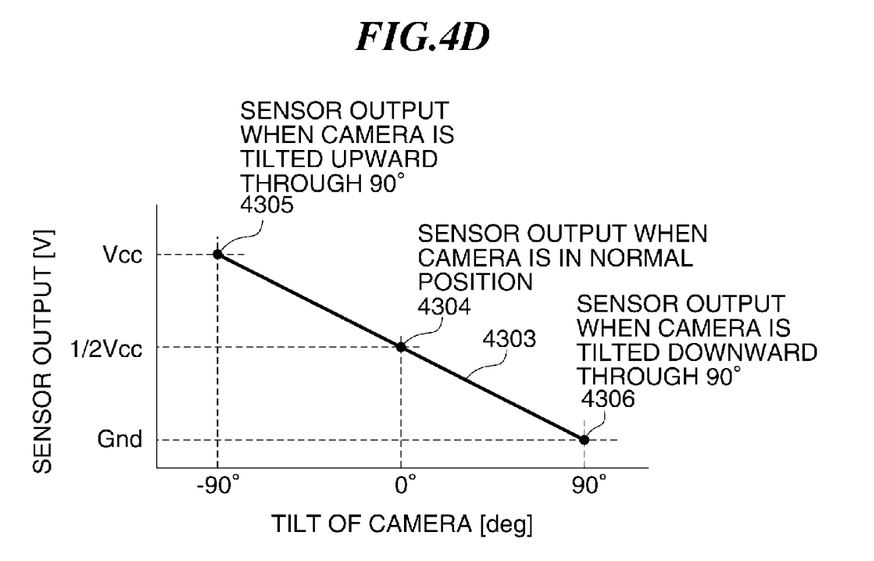

FIG. 4D illustrates output characteristics of the tilt sensor 69 with respect to the Z-axis direction in the respective states illustrated in FIGS. 4A, 4B, and 4C. In FIG. 4D, the vertical axis represents an output from the tilt sensor 69 with respect to the Z-axis direction, and the horizontal axis represents a tilt of the digital camera 100 in the front-rear direction. In FIG. 4D, a straight line 4303 represents an amount of change in the output from the tilt sensor 69 with respect to the Z-axis direction, occurring according to the tilt of the digital camera 100 in the front-rear direction.

In the output characteristics shown in FIG. 4D, the output from the tilt sensor 69 with respect to the Z-axis direction is configured to take values within an output range illustrated therein by properly configuring the gain setting of the amplifier 68 that amplifies the output from the tilt sensor 69 with respect to the Z-axis direction.

As shown in FIG. 4D, an output 4304 from the tilt sensor 69 with respect to the Z-axis direction when the digital camera 100 is in the normal position (the elevation angle is equal to 0 degrees) is equal to ½ of the power supply voltage Vcc. On the other hand, when the digital camera 100 is tilted upward through 90 degrees as shown in FIG. 4A (the elevation angle is equal to 90 degrees), an output 4305 from the tilt sensor 69 with respect to the Z-axis direction is equal to the power supply voltage Vcc.

Further, when the digital camera 100 is tilted downward through 90 degrees as shown in FIG. 4C (the depression angle is equal to 90 degrees), an output 4306 from the tilt sensor 69 with respect to the Z-axis direction is equal to the ground (GND) level.

Further, as shown in FIG. 4D, between the points 4304 and 4305 and between the points 4304 and 4306, the output from the tilt sensor 69 shows characteristics that it linearly changes with respect to the tilt of the digital camera 100 in the front-rear direction.

Therefore, by acquiring the output from the tilt sensor 69 with respect to the Z-axis direction, the digital camera 100 can calculate the current tilt angle (elevation angle or depression angle) of the digital camera 100 in the front-rear direction. Therefore, the digital camera 100 determines which direction the digital camera 100 points, upward or downward, using the tilt angle in the front-rear direction. Further, by changing the display position of the horizontal guide according to the result of the determination, the digital camera 100 can display the horizontal guide in the vicinity of the horizontal line contained in an object image. It should be noted that the term "horizontal line" is intended to mean a line which horizontally extends in the real word, such as a land horizon or a base line of a building.

Assuming that the tilt sensor 69 is mounted in an opposite direction, when the digital camera 100 is tilted in the front-rear direction, the sensor output voltage changes inversely to the FIG. 4D illustration.

Next, a description will be given of a horizontal guide-superposing display process executed by the digital camera 100 as an image pickup apparatus according to the first embodiment, for displaying the horizontal guide on a live view display (display by the above-mentioned electronic viewfinder function) in a superposed manner, with reference to FIG. 5.

The horizontal guide-superposing display process is executed during execution of the live view display by the digital camera 100 e.g. when the tilt is noticeable and an object is likely to include the horizontal line. The digital camera 100 may be configured to always execute the superposed display of the horizontal guide when performing the live view display.

When the horizontal guide-superposing display process is started, the system controller 50 calculates a tilt angle in the front-rear direction, using an output from the tilt sensor 69 with respect to the Z-axis direction which is amplified by the amplifier 68 (step S5701).

Next, the system controller 50 determines whether or not the tilt angle in the front-rear direction calculated in the step S5701 is not less than a predetermined angle α (step S5702). In this step, if it is determined that the tilt angle in the front-rear direction is not less than the predetermined angle α (YES to S5702), it is judged that the digital camera 100 points upward, and the process proceeds to a step S5703.

Next, the system controller 50 sets the display position of the horizontal guide to a lower portion of the screen (step S5703).

On the other hand, if it is determined that the tilt angle in the front-rear direction is less than the predetermined angle α (NO to S5702), the process proceeds to a step S5704, wherein the system controller 50 determines whether or not the tilt angle in the front-rear direction is not more than a predetermined angle β. If it is determined that the tilt angle in the front-rear direction is not more than the predetermined angle β (YES to S S5704), it is judged that the digital camera 100 points downward, so that the process proceeds to a step S5705.

In the step S5705, the system controller 50 sets the display position of the horizontal guide to an upper portion of the screen. It should be noted that α>β.

If the system controller 50 determines in the step S5704 that the tilt angle in the front-rear direction is more than the predetermined angle β, it is judged that the digital camera 100 points neither upward nor downward, but is in the substantially horizontal position, so that the process proceeds to a step S5706. That is, if the system controller 50 as a position determination unit for determining the display position of the horizontal guide determines in the step S5704 that the tilt angle in the front-rear direction is more than the predetermined angle β, it is judged the tilt angle is within a range in which the elevation angle is set to 0 degrees.

Next, in the step S5706, the system controller 50 as the position determination unit for determining the display position of the horizontal guide sets the display position of the horizontal guide to a central portion of the screen.

Figure 6:
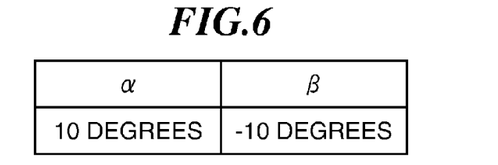
FIG. 6 is a view of a ROM table that stores tilt angles as reference values for use in the horizontal guide-superposing display process in FIG. 5.

Here, the above-mentioned predetermined angles α and β as reference values may be obtained by referring to a ROM table of the reference values of tilt angles as shown in FIG. 6, stored in the storage device 52, or may be determined by some calculation. In doing this, the reference values of α and β may be changed according to a set shooting mode, a focal length of the lens, an aspect ratio of an image, or the like.

In the case of the first embodiment in which the reference values shown in FIG. 6 are used, if the tilt angle is not less than 10 degrees upward, the system controller 50 judges that the digital camera 100 points upward, so that the display position of the horizontal guide is set to the lower portion of the screen of the image display section 28.

Further, if the tilt angle is not less than 10 degrees downward, the system controller 50 judges that the digital camera 100 points downward, so that the display position of the horizontal guide is set to the upper portion of the screen of the image display section 28.

If neither of the above-mentioned cases hold, i.e. if the tilt angle is more than −10 degrees and less than +10 degrees, the system controller 50 judges that the digital camera 100 points neither upward or downward, but is substantially horizontal in the front-rear direction, so that the display position of the horizontal guide is set to the central portion of the screen.

Next, the system controller 50 calculates the tilt angle in the lateral direction using outputs from the tilt sensor 69 with respect to the X-axis direction and the Y-axis direction which are amplified by the amplifier 68 (step S5707).

Next, the system controller 50 displays the horizontal guide on the image display section 28 based on the tilt angle in the lateral direction calculated in the step S5707 (step S5708). Here, the display position of the horizontal guide is the display position set in one of the above-mentioned steps S5703, S5705, and S5706.

Figure 7A:
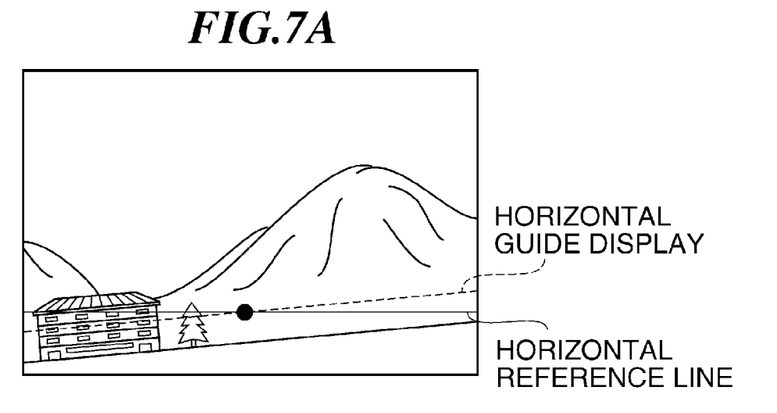
FIGS. 7A, 7B, and 7C are views illustrating examples of display of the horizontal guide.
Figure 7B:
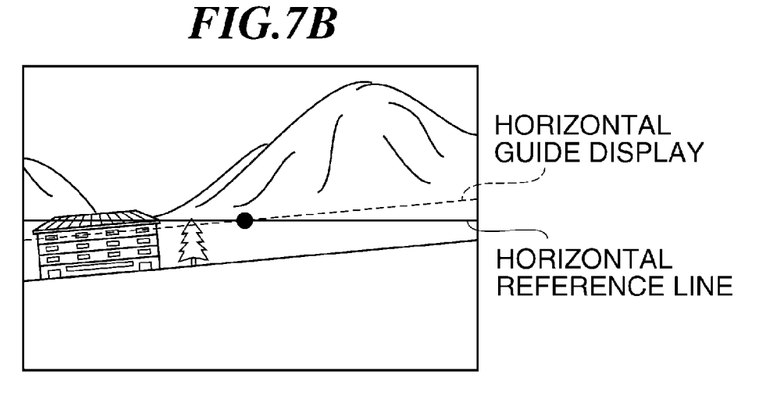
Figure 7C:
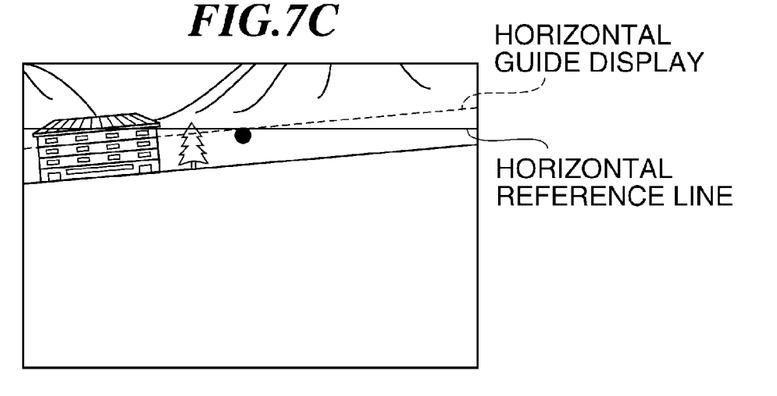

As described above, when the horizontal guide is displayed on the live view display in a superposed manner, the display is performed on the image display section 28 as in examples illustrated in FIG. 7A to 7C. FIGS. 7A, 7B, and 7C illustrate the display examples when the digital camera 100 is tilted rightward. It should be noted that the horizontal guide is displayed as a straight line (broken line in the illustrated example) which is indicative of a tilt of the digital camera 100 in the lateral direction (X axis) perpendicular to the front-rear direction (optical axis), the tilt being determined based on the outputs from the tilt sensor 69 with respect to the X-axis direction and the Y-axis direction.

FIG. 7A illustrates an example of the display of the horizontal guide when the display position of the horizontal guide is set to the lower portion of the screen in the step S5703. As is apparent from the FIG. 7A, the horizontal guide and the horizontal reference line are displayed in the vicinity of the horizontal line contained in an object image displayed on the live view display. This makes it easy to check the tilt of the digital camera 100.

Similarly, FIG. 7B illustrates an example of the display of the horizontal guide when the display position of the horizontal guide is set to the central portion of the screen in the step S5706, and FIG. 7C illustrates an example of the display of the horizontal guide when the display position of the horizontal guide is set to the upper portion of the screen in the step S5705.

As is apparent from FIGS. 7B and 7C, in each case, the horizontal guide and the horizontal reference line are displayed in the vicinity of the horizontal line contained in each object image displayed on the live view display. Therefore, this makes it easy to check the tilt of the digital camera 100.

It should be noted that to maintain the horizontal position by correcting the tilt of the digital camera 100, the photographer only needs to move the digital camera 100 such that the displayed horizontal guide comes to coincide with the horizontal reference line, while viewing such displays as illustrated in FIGS. 7A, 7B, and 7C.

As described above, the horizontal guide is displayed such that it is positioned in an upper portion of the image display section 28 when the angle formed between the Z-axis (optical axis) and the Z'-axis (gravity direction+90°) is less than the predetermined angle α than when the same is not less than the predetermined angle α. Further, the horizontal guide is displayed such that it is positioned in an upper portion of the image display section 28 when the angle formed between the Z-axis (optical axis) and the Z'-axis is not more than the predetermine angle β than when the same is more than the predetermine angle β.

That is, the display position of the horizontal guide is determined such that the horizontal guide is displayed in an upper portion of the image display section 28 when the angle formed between the optical axis and the gravity direction is smaller than when the same is equal to a predetermined angle.

As described above, according to the first embodiment, by changing the display position of the horizontal guide depending on the tilt angle in the front-rear direction, the horizontal guide is moved close to the vicinity of the horizontal line contained in an object image displayed on the live view display. This makes it easy to check the tilt of the digital camera 100.

Next, a description will be given of an image pickup apparatus according to a second embodiment of the present invention. The configuration of the digital camera 100 as the image pickup apparatus according to the second embodiment is the same as the digital camera 100 as the image pickup apparatus according to the above-described first embodiment, shown in FIG. 1, and hence detailed description thereof is omitted while using the same reference numerals.

The digital camera 100 as the image pickup apparatus according to the second embodiment performs control for determining the display position of the horizontal guide depending on the focal length of the photographic lens 310.

Figure 8:
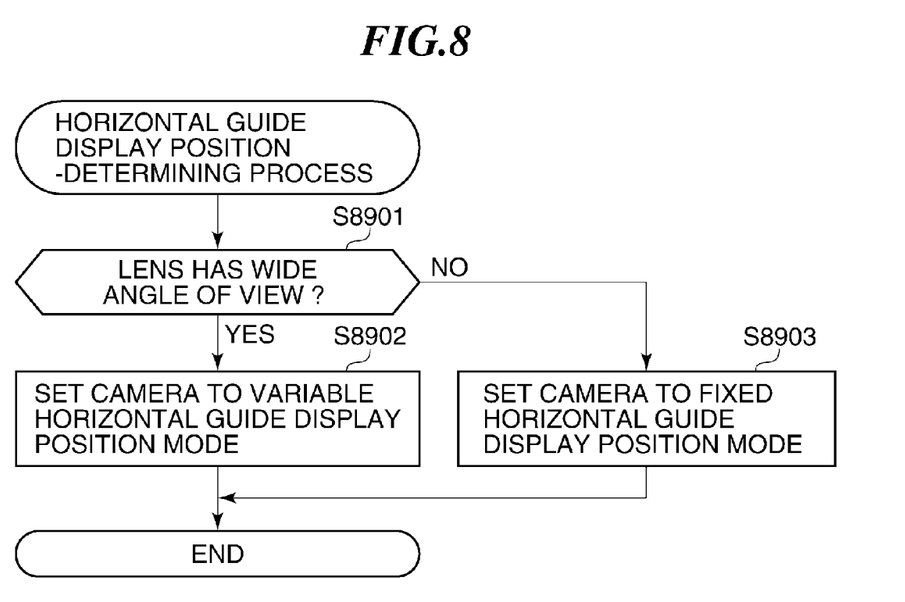
FIG. 8 is a flowchart of a horizontal guide display position-determining process executed by a digital camera as an image pickup apparatus according to a second embodiment of the present invention.

A description will be given of a horizontal guide display position-determining process executed by the digital camera 100 depending on the focal length of the photographic lens 310, with reference to FIG. 8.

When the tilt is noticeable and an object image tends to contain a horizontal line during execution of the live view display, the digital camera 100 executes the superposed display of the horizontal guide.

When the horizontal guide superposing display is started, the system controller 50 acquires focal length information on the photographic lens 310, and determines whether or not the photographic lens 310 has a wide angle of view (step S8901). In this step, the focal length information as a threshold for determining whether or not the photographic lens 310 has a wide angle of view may be acquired by referring to a ROM table or may be determined by some calculation.

If it is determined that the photographic lens 310 has a wide angle of view (YES to S8901), the system controller 50 sets the digital camera 100 to a variable horizontal guide display position mode in which the display position of the horizontal guide is changed according to the tilt angle in the front-rear direction (step S8902), followed by terminating the present process.

Figure 5:
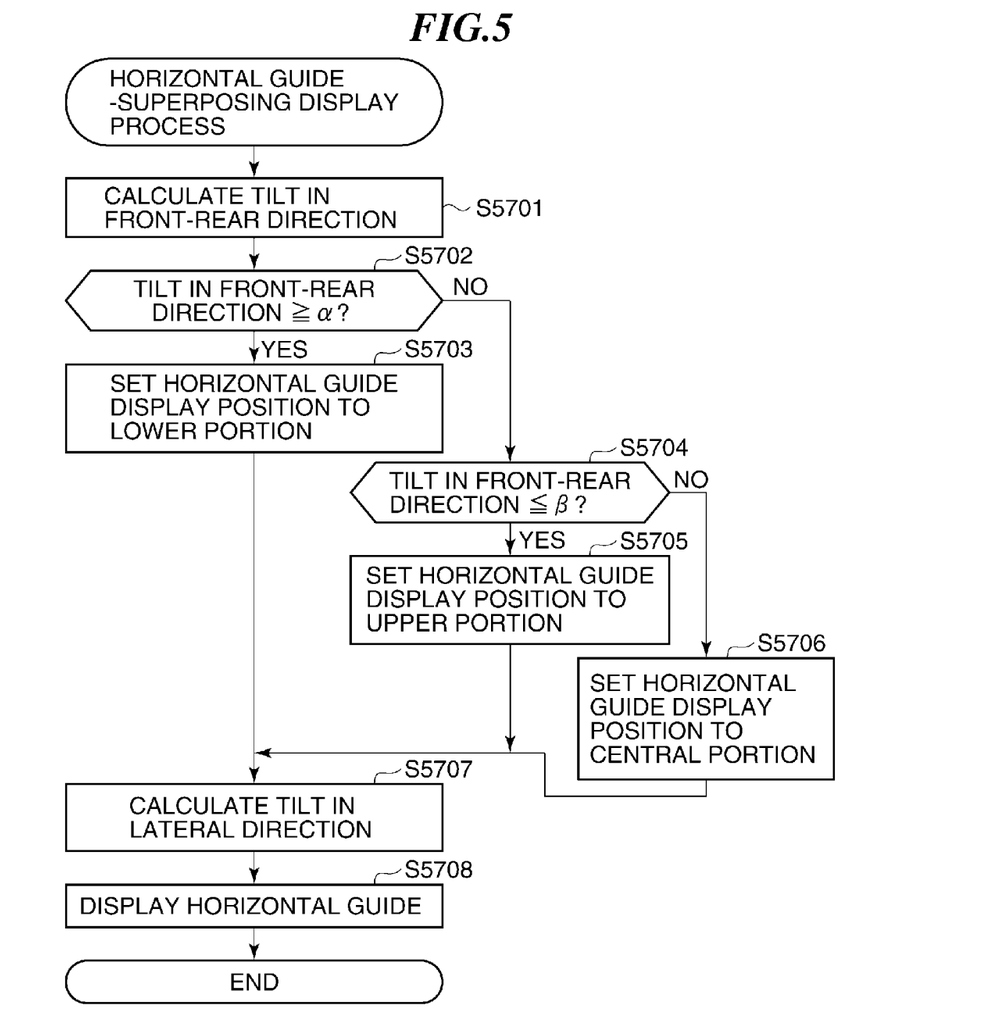
FIG. 5 is a flowchart of a horizontal guide-superposing display process executed by the digital camera as the image pickup apparatus according to the first embodiment.

In the variable horizontal guide display position mode, the method of changing the display position of the horizontal guide is the same as that described in the first embodiment with reference to FIG. 5, and hence description thereof is omitted.

On the other hand, if it is determined in the step S8901 that the photographic lens 310 does not have a wide angle of view, the process proceeds to a step S8903, wherein the system controller 50 sets the digital camera 100 to a fixed horizontal guide display position mode in which the display position of the horizontal guide is fixed to the central portion of the screen, followed by terminating the present process. In this case, the display position of the horizontal guide is always in the central portion of the screen regardless of the tilt angle in the front-rear direction.

The control described above is performed for the following reason: For example, when the focal length is increased to the telephoto side, the frequency of an object image containing the horizontal line is reduced compared with a case where the focal length is reduced toward the wide angle which is often used for scenery shooting, so that it is possible to judge that it is not necessary to change the display position of the horizontal guide.

As described above, in the second embodiment, only when the wide-angle lens which is frequently used for scenery shooting is mounted, the display position of the horizontal guide is changed. This makes it possible to change the display position of the horizontal guide only in the scenery shooting in which the tilt is noticeable and the frequency of an object image containing the horizontal line is considered to be high.

Further, the image pickup apparatus of the present invention may be configured such that the display position of the horizontal guide is changed only in a case where the shooting mode set by the mode dial switch 60 is the scenery shooting mode.

In the above-described embodiments, the description has been given of the case where the two predetermined angles α and β are used as thresholds.

However, the present invention is not limited to this, but the display position of the horizontal guide may be determined by using only one threshold or by using more thresholds, or the display position of the horizontal guide may be set according to an angle formed between the optical axis and the gravity direction.

In any case, according to the present invention, the horizontal guide is a displayed in an upper portion of the image display section 28 when the angle formed between the optical axis and the gravity direction is smaller than when the same is equal to a predetermined angle.

Further, according to the present invention, the area for the display position of the horizontal guide may be determined according to the angle formed between the optical axis and the Z'-axis (or the angle formed between the optical axis and the gravity direction). Thereafter, edge analysis may be performed on the image displayed on the live view display to perform edge detection on a portion of the image corresponding to the horizontal line, and then, based on the results of the detection, the control section may finely adjust the display position of the horizontal guide within the area for the display position to the position of a portion of the image which is judged to have a highest possibility of being the sea horizon or the land horizon.

As described above, in the present invention, the area for determining the sea horizon or the land horizon is limited according to the angle formed between the optical axis and the Z' axis. Therefore, according to the present invention, it is possible to perform more reliable determination of the position of the sea horizon or the land horizon than when the position having the highest possibility of being the sea horizon or the horizon is determined from the whole image only by the judgment based on the edge analysis. Therefore, according to the present invention, it is possible to display the horizontal guide to the position of the sea horizon or the land horizon with high reliability, to thereby facilitate adjustment of the tilt of the digital camera 100.

It should be noted that the control of the system controller 50 may be performed by one unit of hardware, or the control processes may be shared by a plurality of units of hardware to thereby control the overall operation of the apparatus.

Further, although in the above-described embodiments, the present invention is applied to the digital camera 100, this is not limitative, but the present invention can be applied to any device insofar as it has an image pickup unit and can detect the tilt of the image pickup unit and display a guide related to the tilt, i.e. it can be applied to a digital video camera, a camera-equipped PDA, a camera-equipped cellular phone terminal, a camera-equipped game machine, a camera-equipped music player, and so forth.

As described above, the image pickup apparatus according to the present invention is configured to display the horizontal guide in the vicinity of the position of the horizon in the scenery or the like of an object image, which (i.e. horizon) moves up and down within the viewfinder according to the elevation angle or depression angle of the optical axis of the image pickup apparatus.

For example, when shooting the scenery by using the image pickup apparatus, if the optical axis of the lens of the image pickup apparatus is pointed to the horizontal direction, there is a high possibility that the horizon in the scenery of the object image displayed in the viewfinder is positioned in the central portion in the viewfinder. Therefore, in the image pickup apparatus, when it is detected by using an acceleration sensor or the like that the optical axis points to the horizontal direction, the system controller 50 controls the horizontal guide to be displayed in the central portion in the viewfinder.

Further, when the optical axis of the lens of the image pickup apparatus is pointed downward by not less than a predetermined angle from the horizontal direction in the scenery shooting, there is a high possibility that the horizon (e.g. land horizon) in the scenery of the object image displayed in the viewfinder is positioned an upper portion than the central portion in the viewfinder. Therefore, in the image pickup apparatus, when it is detected by using the acceleration sensor or the like that the optical axis points downward, the system controller 50 controls the horizontal guide to be displayed in the upper portion in the viewfinder.

Further, when the optical axis of the lens of the image pickup apparatus points upward by not less than a predetermined angle from the horizontal direction in the scenery shooting, there is a high possibility that the horizon in the scenery of the object image displayed in the viewfinder is positioned a lower portion than the central portion in the viewfinder. Therefore, in the image pickup apparatus, when it is detected by using the acceleration sensor or the like that the optical axis points upward, the system controller 50 controls the horizontal guide to be displayed in the lower portion in the viewfinder.

It should be noted that the image pickup apparatus may be configured such that the position of the horizontal guide to be displayed in the viewfinder is moved more closely to the horizon in a object image according to the degree of the elevation angle or the depression angle detected by the acceleration sensor or the like.

In the image pickup apparatus of the present invention, the horizontal guide is controlled to be displayed in the viewfinder as described above, and hence it is possible to display the horizon or the like and the display of the horizontal guide in the viewfinder close to each other in a superposed manner.

This enables the user to easily recognize a difference in the tilt angle by comparing the horizon or the like on the scenery displayed in the viewfinder and the horizontal guide displayed in the vicinity of the horizon, and hence the user can easily adjust the attitude of the image pickup apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2010-078015 filed Mar. 30, 2010, which is hereby incorporated by reference herein in its entirety.

What is claimed is:
1. An image pickup apparatus comprising:
an image pickup unit;
a tilt detection unit configured to detect a tilt of the image pickup apparatus;
a display unit configured to display an image;
a display control unit configured to control said display unit to display a horizontal guide which indicates an angle formed between a lateral direction of the image pickup apparatus which is perpendicular to an optical axis of the image pickup apparatus and a horizontal direction which is perpendicular to gravity direction, together with an image picked up by the image pickup unit;
wherein the horizontal guide is displayed in a first position of the display unit when an angle formed between the optical axis of the image pickup apparatus and a gravity direction is equal to a first angle smaller than a second angle, and
the horizontal guide is displayed in a second position lower than the first position of the display unit when the angle formed between the optical axis and the gravity direction is equal to the second angle.

2. The image pickup apparatus according to claim 1, wherein the horizontal guide is displayed in a fixed position regardless of the angle formed between the optical axis of the image pickup apparatus and the gravity direction, when an angle of view of a lens mounted on the image pickup apparatus is not wider than a predetermined value.

3. The image pickup apparatus according to claim 1, wherein the horizontal guide is displayed in a fixed position regardless of the angle formed between the optical axis of the image pickup apparatus and the gravity direction, when a current shooting mode of the image pickup apparatus is not suitable for scenery shooting.

4. The image pickup apparatus according to claim 1, wherein the display position of the horizontal guide is adjusted based on edge detection performed on a portion of an image to be displayed on the display unit, the portion corresponding to a horizon.

5. The image pickup apparatus according to claim 1, wherein the horizontal guide is displayed in the vicinity of a reference line represented by a straight lateral line in the display unit, as a straight line which is indicative of a tilt of the image pickup apparatus in a lateral direction which is perpendicular to the optical axis, the tilt of the image pickup apparatus in the lateral direction being determined based on the tilt of the image pickup apparatus detected by said tilt detection unit.

6. A method of controlling an image pickup apparatus including an image pickup unit, and a display unit that displays an image, comprising:
   detecting a tilt of the image pickup apparatus;
   controlling the display unit to display a horizontal guide which indicates an angle formed between a lateral direction of the image pickup apparatus which is perpendicular to an optical axis of the image pickup apparatus and a horizontal direction which is perpendicular to gravity direction, together with an image picked up by the image pickup unit;
   displaying the horizontal guide in a first position of the display unit when an angle formed between the optical axis of the image pickup apparatus and a gravity direction is equal to a first angle smaller than a second angle, and
   displaying the horizontal guide in a second position lower that the first position of the display unit when the angle formed between the optical axis and the gravity direction is equal to the second angle.

7. A non-transitory computer-readable storage medium storing a computer-executable program for causing a computer to execute a method of controlling an image pickup apparatus including an image pickup unit, and a display unit that displays an image,
   wherein the method comprises:
   detecting a tilt of the image pickup apparatus;
   controlling the display unit to display a horizontal guide which indicates an angle formed between a lateral direction of the image pickup apparatus which is perpendicular to an optical axis of the image pickup apparatus and a horizontal direction which is perpendicular to gravity direction, together with an image picked up by the image pickup unit;
   displaying the horizontal guide in a first position of the display unit when an angle formed between the optical axis of the image pickup apparatus and a gravity direction is equal to a first angle smaller than a second angle, and
   displaying the horizontal guide in a second position lower that the first position of the display unit when the angle formed between the optical axis and the gravity direction is equal to the second angle.

* * * * *